(No Model.)
A. R. LEEDS.
APPARATUS FOR PURIFICATION OF WATER.
No. 323,431. Patented Aug. 4, 1885.
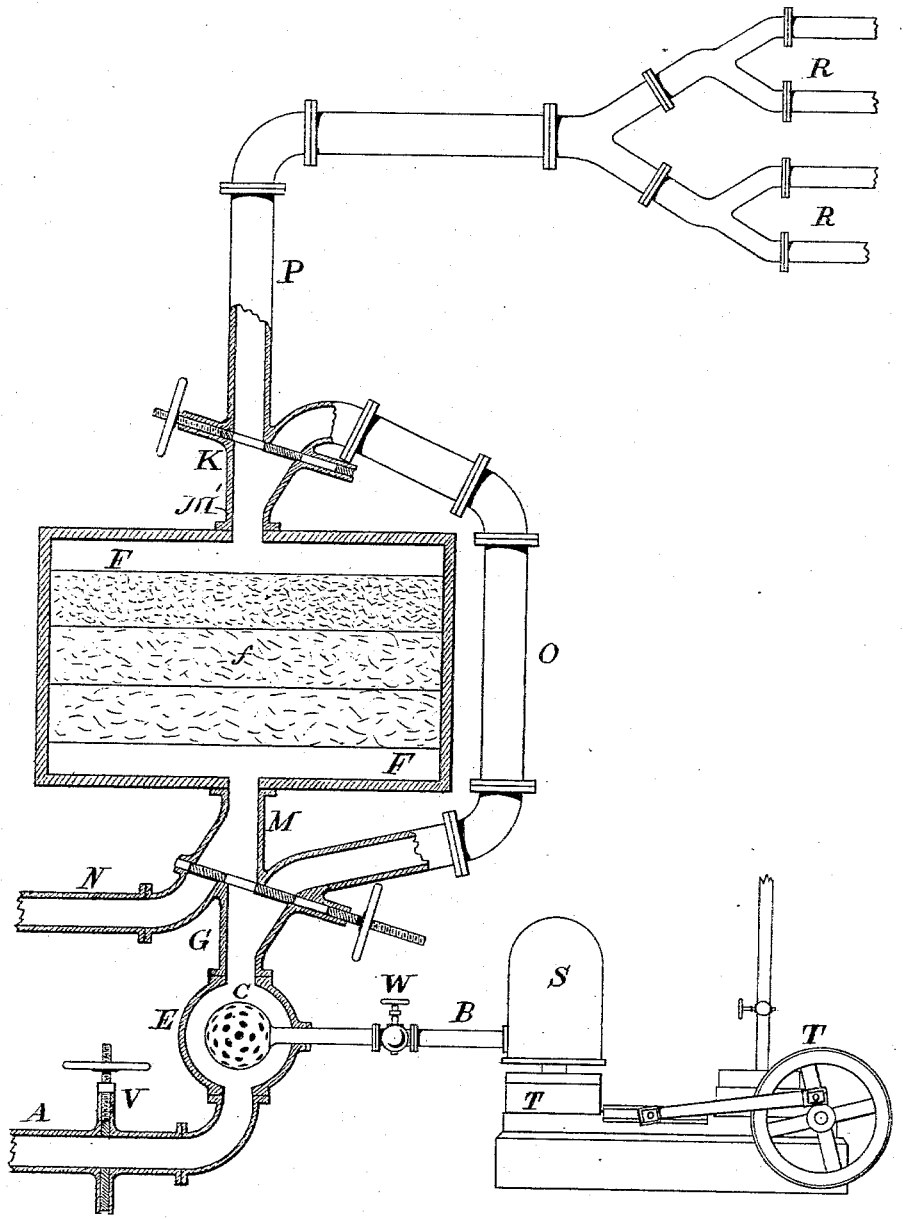
WITNESSES:
Henry A. Lamb.
Ollie J. Adams.
INVENTOR
Albert R. Leeds
BY
James Skinkle.
ATTORNEYS

UNITED STATES PATENT OFFICE.

ALBERT R. LEEDS, OF HOBOKEN, NEW JERSEY.

APPARATUS FOR PURIFICATION OF WATER.

SPECIFICATION forming part of Letters Patent No. 323,431, dated August 4, 1885.

Application filed December 26, 1884. (No model.)

*To all whom it may concern:*

Be it known that I, ALBERT R. LEEDS, a citizen of the United States, residing at Hoboken, in the county of Hudson and State of New Jersey, have invented certain new and useful Improvements in Apparatus for Purification of Water, of which the following is a specification, reference being had to the accompanying drawing.

In my application for Letters Patent of the United States filed September 17, 1883, and patented April 8, 1884, No. 296,337, I have described an apparatus that utilizes the discovery that when air and water are both under great artificial pressure, in contact with each other and both in motion, the water absorbs the oxygen of the air with great rapidity, and is thereby rendered pure and fit for drinking purposes.

In the apparatus above referred to I made use of a water-pipe supplying water under pressure, connected with an air-pipe supplying air under pressure, and both being in combination with a series of chambers arranged at intervals along a pipe for connecting the mixture of air and water under pressure to some suitable reservoir. I have found that the objects of my invention could be attained by causing the mixture of air and water under pressure to pass through filter-chambers arranged along the pipe, instead of through chambers filled with compressed air only. The object in using these filter-chambers is two fold: in the first place, to strain out the mechanically-suspended particles of mineral matters, and also of organic matter not capable of atmospheric oxidation and destruction; and, in the second place, to cause the compressed air and the water to come together upon a greatly-extended surface of solid bodies. Porous substances of the nature of charcoal present the largest amount of surface in proportion to their weight, and are therefore best adapted to serve in the construction of filters to be used in connection with my apparatus; but it should be expressly stated that my present application relates to no particular description of filters or filtering media, but only to the use of such media in connection with an apparatus to bring water in a state of motion under pressure in contact with air in a state of motion and under pressure, and afterward to subject the mixture of air and water still under pressure and in motion to the action of filtering media in a filter-chamber, in the manner hereinafter more especially described.

The accompanying drawing is a sectional elevation of apparatus embodying my invention, in which A is a water-pipe for supplying water under pressure, and may be closed by a hand or automatic valve, V. The pipe A is expanded into the form of a chamber, which may be a globular vessel, E, within which is located the finely-perforated discharge-nozzle or hollow sphere C, which communicates by means of the pipe B, provided with suitable hand or automatic valve, W, with the air-reservoir S and the air-compressor T. From the chamber E the main pipe is continued to a two-way valve, G, one passage through which leads by way of pipe M into a chamber, F, supplied with a filtering substance, $f$. From this chamber the main pipe continues by pipe M' through the two-way valve K, and into the line or conveying pipe P, and thence to a suitable reservoir, or into the distributing-pipes R.

The above description relates to those portions of my apparatus which are made use of when the mixture of air and water in its forward passage from the aerating-chamber E is submitted to the action of filtration in the chamber F.

After a time the filtering media becomes clogged with suspended matters, and its action, in connection with a mixture of air and water, diminishes in energy; and in order to cleanse the filter and restore it to its original condition of efficiency, I provide a branch pipe, O, that connects with the second passage in each of the two-way valves, G and K, leading, respectively, to and out of the filter F, and I also provide a waste-pipe, N, connected with pipe M leading into the filter. By reversing the valves G K the stream of water and air, or water alone will be diverted from its previous course through branch pipe O into the opposite end of the filter F, thence through the filtering media and out by waste-pipe N, carrying with it the impurities lodged in and arrested by the filter. After sufficient fluid has passed through the filter to cleanse it the valves G and K are brought back into their first position, and the direct movement of the air and water is re-established.

Instead of the perforated sphere C, a perforated cylinder or a rectangular box or other suitable chamber provided with perforations can be employed. I am aware that such perforated vessels for causing air to pass through liquids in finely-divided condition are a well-known mechanical device, and I do not in this application claim their use except in connection with the aeration and purification of water when brought into contact while in motion and under pressure with air likewise in motion and under pressure.

Instead of particular forms of valves G and K, any other or suitable form of valves can be employed, by means of which the direct passage from G through M into the filter F into the direct conveying-pipe P, while by another position of said valves the lateral passages into O, from O into F, and from F into N, can be simultaneously opened.

Having described my invention, what I desire to secure by Letters Patent is—

1. In an apparatus for the purification of water, the combination, with a pipe, A, for supplying water under pressure, and a pipe communicating therewith for injecting compressed air thereinto, of a closed chamber containing filtering material, through which the mixture of the air and water is forced while under pressure, as set forth.

2. In an apparatus for the purification of water, the water-pipe A, supplying water under pressure, and the air-pipe B, which supplies air under pressure into the water in pipe A, in combination with the filter-chamber F, wherein the mixture of air and water still under pressure is submitted to the action of filtering, and a circulating pipe O, provided with suitable stop-cocks, whereby the filter can be supplied with either air or water, separately or combined, substantially as set forth.

3. In an apparatus for the purification of water, the combination, with the water-supply pipe A, the air-supply pipe B, and the mixing-chamber E, of the filter F, and the valves G K, and pipe O, in the manner and for the purposes set forth.

4. In an apparatus for the purification of water, the combination, with the water-supply pipe A, air-supply pipe B, provided with perforated end C, the chamber E, filter F, and suitable conveying-pipe, substantially as set forth.

In testimony whereof I hereto affix my signature in presence of two witnesses.

ALBERT R. LEEDS.

Witnesses:
F. LUTHIN,
C. STRAUS.